July 24, 1934.  E. SWEDMAN ET AL  1,967,456
GASKET AND ATTACHMENT
Filed May 23, 1931
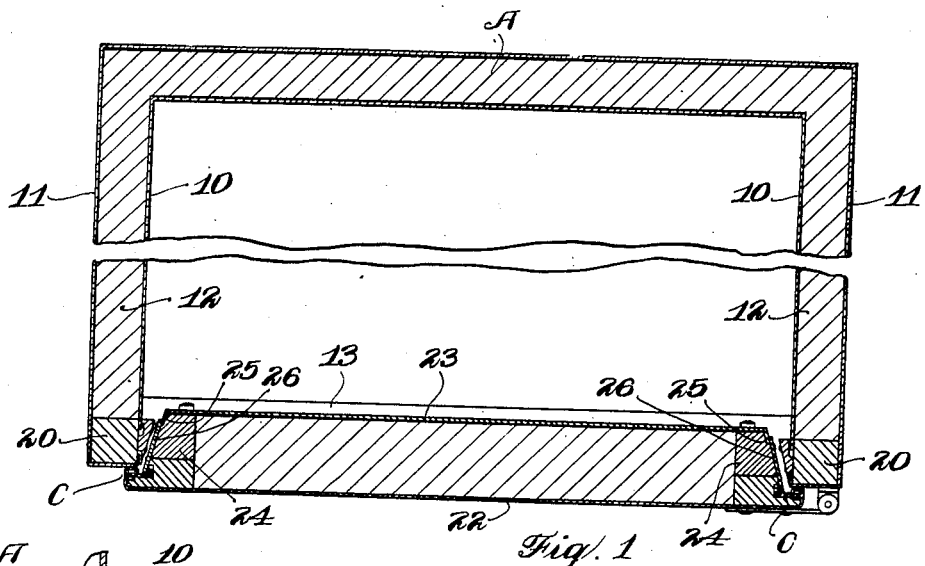
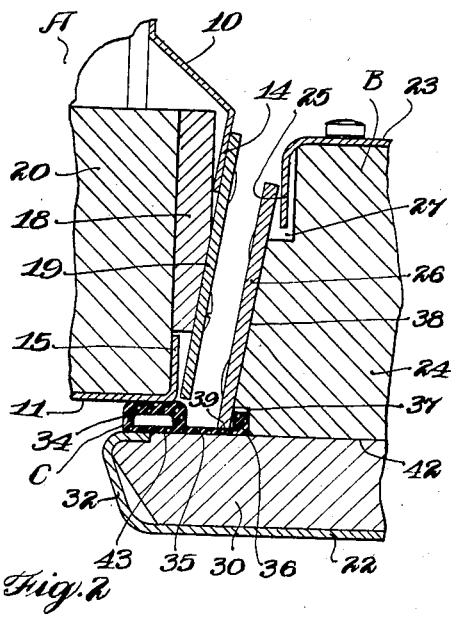
Fig. 2
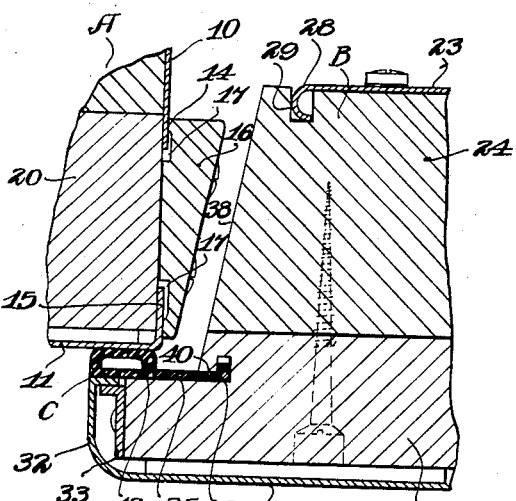
Fig. 3
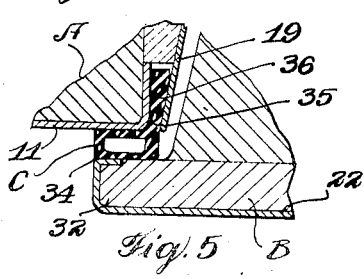
Fig. 5
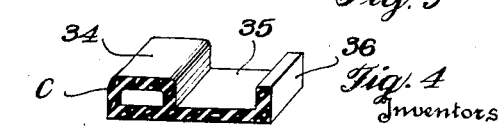
Fig. 4
Inventors
Enoch Swedman
Walter H. Ellsworth
By Howard Pichen
Attorney Patented July 24, 1934

1,967,456

UNITED STATES PATENT OFFICE 1,967,456

GASKET AND ATTACHMENT

Enoch Swedman and Walter A. Ellsworth, St. Paul, Minn., assignors to Seeger Refrigerator Company, St. Paul, Minn., a corporation of Minnesota Application May 23, 1931, Serial No. 539,472

12 Claims. (Cl. 20—35)

Our invention relates to an improvement in gasket and attachment, and it is particularly adapted for use on refrigerator closures and the like, to provide an air tight seal around the closure between the inside of the refrigerator and the outside thereof when the refrigerator is closed.

It is our object to provide a gasket having a resilient body of such a nature that it will flatten out somewhat when pressure is exerted against the same from both sides. Accordingly, when the refrigerator is closed, the gasket is pressed firmly between the closure and the body of the refrigerator, providing an air tight seal.

The purpose of our invention is to provide a novel means of anchoring the gasket in the closure in such a manner that the same may be removed by pulling it out of place, the anchoring flange being pulled out of its aperture in the closure. The gasket may be replaced in the closure by forcing the anchoring flange in its aperture with a thin blade.

The gasket made in accordance with our invention is provided with a hollow and adapted to be compressed between the closure and the refrigerator as the refrigerator is closed. The hollow tubular cushion end is connected by means of a flat connecting strip to a short anchoring flange which extends upwardly at the extreme edge of the connecting strip at right angles thereto. A slot or aperture is formed in the body of the closure frame in which this anchoring flange is positioned, and this aperture is connected to the flange of the closure upon which the gasket is adapted to lie by means of a restricted portion which ordinarily holds the gasket in position. As the gasket is made of resilient material, however, the gasket may be forcibly removed or replaced by flexing the anchoring flange out of its natural shape and forcing it through the restricted portion.

It is our purpose to either form the aperture and restricted portion directly in the frame of the closure, or to form the aperture in the edge of the frame and form the restricted portion by extending a portion of the breaker strip partially over the aperture. The end of the breaker strip is spaced from the flange of the closure just sufficiently to provide the proper restricted passage.

For the purpose of describing the invention, we are illustrating the gasket as applied upon the closure of a refrigerator, but it is obvious that it could be attached to the body of the refrigerator adjacent the door openings, or may be used in any construction in which a gasket of this general class is used.

Other objects and novel features of our invention will be more fully and clearly set forth in the following specification and claims.

In the drawing forming a part of this specification:

Figure 1 illustrates a section through a refrigerator taken on a horizontal plane.

Figure 2 is a cross-sectional view through a porton of the refrigerator closure and body.

Figure 3 is a cross-sectional view similar to Figure 2, but illustrating a slightly different form of construction.

Figure 4 is a perspective view of a piece of gasket constructed in accordance with the principles of our invention.

Figure 5 is a sectional detail showing the gasket held by the refrigerator body.

The refrigerator A is equipped with a closure B as illustrated in Figure 1 of the drawing. This closure may be made as shown, opening virtually the entire front of the refrigerator, or the front of the refrigerator A may be divided and several doors be formed to allow access to various compartments within the body of the refrigerator A.

As illustrated, the refrigerator A is provided with an inner lining 10 and an outer surface 11, having suitable insulating means 12 therebetween. Around the door opening 13, the end 14 of the inner lining 10 and the end 15 of the outer surface 11, may be covered by a breaker strip 16, as illustrated in Figures 1 and 3 of the drawing. Cut away portions 17 adjacent the ends 14 and 15 insure the close contact of the breaker strip 16 with these ends at the edges of the breaker strip. If preferred, a jamb moulding backing strip 18 may be placed between the ends 14 and 15, and these ends then covered by means of a jamb moulding 19 as illustrated in Figure 2. The jamb moulding 19 and backing 18 form a breaker strip to prevent a continuous metal connection between the inside and outside of the refrigerator A. The moulding 19 and the breaker strip 16 are formed of micarta, bakelite or other insulating material, and are secured to the frame 20 between the walls 10 and 11 of the refrigerator. Other similar constructions may be used.

The door or closure B is provided with an outer covering plate 22 and an inner lining sheet 23. Means is provided between these surfaces 22 and 23 to avoid a continuous metal connection between the front or outer covering 22 and the inner lining 23. In Figure 1, the inner sheet 23 is bent over the beveled stile 24 forming a part of the frame of the door B, and this inturned edge 25 is covered by an insulation breaker strip 26 extending entirely over the exposed surface of the stile 24. This design is also followed in the modification illustrated in Figure 2. In this form, however, the inturned edge 25 extends virtually at right angles with the lining sheet 23, and extends into a notch 27 formed in the stile 24. This construction insures a tight contact between the breaker strip 26 and the edge 25 along the edge of the breaker strip.

Figure 3 illustrates a modification in which the inner lining 23 is provided with a beaded edge 28 adapted to fit into a groove 29 in the stile 24 of the door frame, and is similarly formed on all sides of the door. In this modification no breaker strip is needed to cover the end of the inner lining, and the stile 24 itself forms the breaker strip.

The outer covering 22 is secured to the stile 30 of the door frame which extends beyond the beveled stile 24 to provide an attaching flange. The stile 30 may itself be enclosed by the channel shaped edge 32 of the outer surface plate 22, or may be held in place by means of bracket clips 33 engaging with this channel shaped edge 32. Other desirable constructions may be used which accomplish the same purpose.

The gasket C, which, together with the manner of attaching the same to structures such as have been described, comprises our invention, is formed with a hollow or tubular cushion 34. This cushion 34 is connected by means of the connecting flange 35 to the anchoring bead or head 36, which may be enlarged sufficient to provide an anchoring member along one edge of the gasket. An aperture 37 or groove is formed in the stile 24 to accommodate this head 36 when the gasket C is in place. In the modification illustrated in Figure 2, this aperture 37 or groove is adjacent the beveled edge 38 of the same. The gasket C is held in place by means of the breaker strip 26, this strip extending to form a restricted passage 39 between the edge thereof and the stile 30. As the gasket C is made of resilient material, it may be removed or inserted by forcing the bead or head 36 through the restricted passage 39. If the gasket C is in place in the door, it may be removed by a strong pull, the head 36 deforming sufficiently to pass through the passage 39. A new gasket may be inserted by using a thin blade such as a putty knife to push the head 36 into the aperture or groove 29. In this modification, the gasket may also be removed or replaced by removing the breaker strip 26.

In Figure 3 the aperture 29 is formed in the stile 30, and is connected to the beveled surface 38 by means of a groove 40 of sufficient width to accommodate the connecting flange 35 when the gasket C is in place. In this type of construction, the gasket C necessarily must be put in position by forcing the anchoring head 36 through the groove 40 in the manner hereinbefore described. Once in place, it could not be dislodged without a strong pull.

It is also possible to make the aperture 29 and groove 40 in the lower edge 42 of the stile 24, the stile 30 being of the shape illustrated in Figure 2. The grooves 29 and 40 could be more readily cut if such a construction were followed.

The gasket C rests upon the upper surface 43 of the stile 30 of the door frame, and covers the edge of the inturned edge of the outer covering sheet, as disclosed in the drawing. When the door B is closed, the cushion 34 is forced against the outer surface 11 of the refrigerator A, producing an air-tight seal.

The construction of one edge of the closure B and door opening 13 has been described in detail. Each of the edges are substantially alike, and the above description is for any edge of the door and opening.

The gasket C may be supported as illustrated in Figure 5 by the body of the refrigerator A. In this construction the member 19 holds the enlarged bead or head 36 beneath the same in the recess between the member 14 and the body of the refrigerator in the closure opening so as to hold the tubular cushion 34 of the gasket C in place so that the edge 32 of the door B may cushion or strike against the same to provide a tight closure in the door opening of the refrigerator.

The tubular gasket C also provides a protecting member having a cushioning nature by reason of its tubular structure to cushion the door B in slamming the same shut and to compensate for the distance between the edge 32 and the body of the refrigerator A as well as protecting the enameled sheathings such as 11 and 22 in the slamming of the door of the refrigerator.

The gasket C thus is easily attached and detached, and forms a tight seal around the edge of the closure B. This type of construction is much to be desired over the common type of gasket now in use, as it lays flat and tight against the door, making a neater application; there are no nails or screws showing, and may be easily replaced. We have found our gasket and the manner of attaching the same to be very practical in actual use, and much to be desired over existing forms.

In accordance with the patent statutes we have described the principles of operation of our gasket and attachment thereof, and while we have endeavored to set forth the best embodiments thereof, we desire to have it understood that this is only illustrative of a means of carrying out our invention, and that other forms of construction embodying the principles may be made within the scope of the following claims without departing from the spirit of the invention.

We claim:

1. A gasket for refrigerator closures including, a hollow striking bead a flat side thereon, a flange projecting from said bead flush with said flat side for supporting said bead, and an enlarged end on said flange to lock said gasket to the refrigerator in a manner to form a striking gasket for the closure of the refrigerator to provide a tight joint between the closure and the refrigerator body.

2. A gasket for refrigerator closures including, a tubular cushion body portion, a flange projecting from one side of said body portion, an anchoring end formed on the same side of said flange as said cushion body and a continuous flat surface from the outer edge of said body to the outer edge of said anchoring end, said gasket adapted to be secured to the refrigerator closure to support the tubular cushion in position to act as a cushion and seal between the closure and the refrigerator body.

3. A cushioning gasket for a refrigerator closure including, a cushion portion formed of resilient material, a flange extending flush with one side of said cushion portion, and means for securing said flange to the door of the refrigerator or the body thereof to hold the cushion in position to provide a gasket for sealing the closure in relation to the body of the refrigerator when closed.

4. A resilient gasket for refrigerators and closures including, a tubular cushion body portion, a flat strip flange projecting from said body portion, an enlarged marginal bead formed on one side of said flat strip flange, a continuous flat surface extending from one extreme edge of said tubular body to the extreme edge of said marginal bead, and means for removably holding said gasket in operative position to place said cushion body portion between the closure and the refrigerator body to seal and cushion the closure with the body of the refrigerator.

5. A resilient gasket for closures including, a tubular marginal member, a flat strip flange portion, and a locking head marginally disposed oppositely to said cushion portion on the same side of said flat strip flange to provide a cushioning gasket for closures having a flat engaging surface extending from one extreme edge to the other of said gasket.

6. A flat resilient gasket and cushion including, an enlarged marginal cushion edge on one side thereof, a locking bead extending marginally along the other edge of said gasket on the same side thereof, and a connecting flange interposed between said cushioning edge and said bead, and a continuous flat surface from the outer edge of said cushion edge, along said flange, to the outer edge of said locking bead.

7. The combination, a refrigerator, a door opening, a sheathing extending over the outer surface of said refrigerator and into said door opening, a door including a marginal flange adapted to overlap said door opening, a sheathing extending around said door flange and over the outer surface thereof, a cushion gasket having a locking end formed along one edge thereof, a cushioning flange extending along the other edge thereof, a connecting portion between said flanges, a continuous flat surface from the outer edge of one flange to the outer edge of the other flange, and a recess for receiving said anchoring flange of said gasket to removably support said gasket in a manner to hold the same with its cushioning portion interposed between the sheathing of said closure and the body of said refrigerator.

8. A refrigerator closure gasket comprising, a flat supporting flange, a cushioning bead along one edge on one side of said flat flange having a flat tubular nature to provide a wide cushion bearing surface, and an anchoring edge formed along the opposite edge on the same side of said supporting flange.

9. A closure gasket having a supporting member, an anchoring portion formed on one edge of one side of said member to removably support said gasket, and an enlarged hollow flat cushion-like portion extending from the other edge of the same side of said supporting member.

10. A refrigerator closure including, a closure body, a metal sheathing over one face of said body including a marginal inturned flange, a projection on said body extending in alignment with said flange, a recess in said closure body adjacent said projection having one side thereof extending in alignment with the surface of said projection, and extending into said body in a direction away from said sheathing, and a gasket including an anchoring bead anchored in said recess and extending over said projection and flange to conceal the joint between the same.

11. A refrigerator closure including, a closure body, a projecting lip extending about said body, a recess in said body adjacent said projecting lip, and a gasket including an anchoring bead positioned in said recess and having a flat side extending the entire width of the gasket, said gasket extending along said lip.

12. A refrigerator closure including, a closure body, a flange extending entirely about said body, a gasket including a flat base adapted to extend along said flange, an anchoring bead on one edge of said base on one side thereof, a tubular cushion along the outer edge thereof on said one side of said base, and a clamping strip to clamp said anchoring bead to said body.

ENOCH SWEDMAN.
WALTER A. ELLSWORTH.